United States Patent
Denoual et al.

(10) Patent No.: US 9,350,796 B2
(45) Date of Patent: May 24, 2016

(54) METHOD AND DEVICE FOR RECEIVING MULTIMEDIA DATA

(71) Applicant: CANON KABUSHIKI KAISHA, Tokyo (JP)

(72) Inventors: Franck Denoual, Saint Domineuc (FR); Fabrice Le Leannec, Mouaze (FR); Naël Ouedraogo, Maure de Bretagne (FR)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 13/862,943

(22) Filed: Apr. 15, 2013

(65) Prior Publication Data

US 2013/0297745 A1    Nov. 7, 2013

(30) Foreign Application Priority Data

Apr. 17, 2012 (GB) .................................. 1206750.0

(51) Int. Cl.
| | |
|---|---|
| *G06F 15/16* | (2006.01) |
| *H04L 29/08* | (2006.01) |
| *H04N 21/44* | (2011.01) |
| *H04N 21/462* | (2011.01) |
| *H04N 21/845* | (2011.01) |
| *H04N 21/442* | (2011.01) |
| *H04N 21/458* | (2011.01) |
| *H04N 21/647* | (2011.01) |

(52) U.S. Cl.
CPC .......... *H04L 67/10* (2013.01); *H04N 21/44004* (2013.01); *H04N 21/44209* (2013.01); *H04N 21/458* (2013.01); *H04N 21/4622* (2013.01); *H04N 21/64738* (2013.01); *H04N 21/845* (2013.01)

(58) Field of Classification Search
None
See application file for complete search history.

(56) References Cited

U.S. PATENT DOCUMENTS

| | | | |
|---|---|---|---|
| 7,653,761 B2* | 1/2010 | Juster et al. | 710/18 |
| 2011/0161174 A1* | 6/2011 | Simms et al. | 705/14.58 |
| 2013/0060956 A1* | 3/2013 | Nagaraj et al. | 709/231 |

FOREIGN PATENT DOCUMENTS

| | | | |
|---|---|---|---|
| WO | WO 2011/119132 A2 | | 9/2011 |
| WO | WO 2011119132 A2 * | | 9/2011 |

OTHER PUBLICATIONS

Gopalakrishnan et al; "CPM: Adaptive Video-on-Demand with Cooperative Peer Assists and Multicast," INFOCOM 2009, IEEE, pp. 91-99, Apr. 15-19, 2009, doi: 10.1109/INFOCOM.2009.5061910. See pp. 91-93.*

Gopalakrishnan et al; "CPM: Adaptive Video-on-Demand with & 17-22 Cooperative Peer Assists and Multicast," INFOCOM 2009, IEEE, pp. 91-99, Apr. 19-25, 2009.

* cited by examiner

*Primary Examiner* — Mohamed Ibrahim
(74) *Attorney, Agent, or Firm* — Canon U.S.A., Inc. IP Division

(57) ABSTRACT

Receiving on a communication device a multimedia data stream composed of a sequence of multimedia data segments from a plurality of data sources, each multimedia data segment having an execution time slot relative to an execution time slot of an initial multimedia data segment of the sequence. Receiving and executing a first multimedia segment, requesting the data source of a subsequent multimedia data segment to transmit a portion of the subsequent multimedia data segment, determining therefrom the transmission capability between the communication device and the data source determining a time to start downloading the subsequent multimedia data segment based on its execution time slot relative to the current time slot and the transmission capability, and downloading, at the determined time, the subsequent multimedia data segment for execution during the execution time slot.

19 Claims, 7 Drawing Sheets

```
<? xml version=« 1.0 » ?>
<mashup>
  <segment id=« S1V1F1 » start='0' end='12'>
    http:/S1.com/V1#t=0,12
  </segment>
  <segment id=« S2V2F2 » start='12' end='22'>
    http:/S2.com/V2#t=5,15
  </segment>
  <segment id=« S3V3F3 » start='22' end='35'>
    http:/S3.com/V3#t=35,58
  </segment>
  <segment id=« S1V4F4 » start='35' end='55'>
    http:/S1.com/V4#t=30,50
  </segment>
  ....
</mashup>
```

131

Aggregated Video

0-12s  5-15s  35-58s  30-50s  55-1m26s

130 t

METHOD AND DEVICE FOR RECEIVING MULTIMEDIA DATA

REFERENCE TO RELATED PATENT APPLICATION

This application claims the benefit under 35 U.S.C. §119 of the filing date of GB Patent Application No. 1206750.0, filed 17 Apr. 2012, hereby incorporated by reference in its entirety as if fully set forth herein.

FIELD OF THE INVENTION

The present invention concerns a method and a device for receiving a stream of multimedia data composed of a sequence of multimedia data segments.

BACKGROUND OF THE INVENTION

The Internet is becoming increasingly exploited by users and consumers for sharing multimedia data such as personal photos or videos. Another growing trend is the use of Internet applications for building what is commonly referred to as "mashups". A mash up refers to multimedia data composed of various multimedia fragments often taken from different data sources.

For example, a multimedia mash up may be built from distributed pieces of multimedia, such as videos, located at different data sources such as Internet servers (e.g. video sharing site, personal Web site, Cloud services, company service, . . . ), by concatenation of different temporal video segments from the different data sources.

The various multimedia segments may be downloaded using an addressing scheme identifying the location of the data source. In 2008, W3C initiated a standardization process for specifying an addressing scheme based on a traditional uniform resource identifier (URI) mechanism. URI is an addressing scheme used to identify resources on the Internet and also provides features for addressing sub parts of a multimedia resource using what is often referred to as a "fragment identifier".

Streaming multimedia data by HTTP (hypertext transfer protocol) is becoming more popular for various reasons. Firstly, more and more video content is being stored on the Internet. Secondly, an HTTP communication server is easier to set up than an RTP/RTSP communication server traditionally used for video streaming. Another reason for the popularity of http for streaming multimedia is due to the success of portable devices such as smart phones and tablet devices that provide Internet and media experience to their mobile users.

Current HTTP streaming is based on a pull model in which the client pulls a sequence of chunks of data, one after another, from a server, based on a manifest file (description) produced by the server describing currently available chunks or segments of data.

A problem often encountered when playing concatenated video data on a display device is ensuring that enough data is available when moving from one video segment to another to enable smooth transitions between the various segments without freezing of the display. This is particularly true because of the differences between the servers storing the video data segments used to build the mash up. As an example, a major video sharing site may be provided with powerful, fast servers while a personal video album stored on a personal computer may have a limited upload link.

SUMMARY OF THE INVENTION

The present invention has been devised to address one or more of the foregoing concerns.

According to a first aspect of the invention there is provided A method of receiving, at a communication device, a multimedia data stream composed of a sequence of multimedia data segments from a plurality of data sources, each multimedia data segment having an execution time slot relative to an execution time slot of an initial multimedia data segment of the sequence the method comprising:

receiving a first multimedia segment of the sequence of multimedia segments from the respective data source and executing said first multimedia segment on the communication device;

during execution of the first multimedia segment, for at least one multimedia data segment subsequent in the sequence to the first multimedia data segment:

determining a time to start downloading said subsequent multimedia data segment based on the execution time slot of said subsequent multimedia data segment relative to the current time slot and the transmission capability between the data source of the said subsequent multimedia data segment and the communication device; and downloading at the determined time the said subsequent multimedia data segment for execution during said execution time slot.

Consequently a smoother transition between the different multimedia segments can be achieved during execution of the multimedia data on a communication device. Moreover the communication device has better control of the downloading and execution of the various multimedia segments.

In some embodiments of the invention, the data sources correspond to different server devices. Some data sources may be for example cloud video services.

In an embodiment at least two subsequent multimedia segments are simultaneously downloaded from at least two different server devices. This enables enough data to be pre-buffered to enable playing to be started without display freeze or without waiting for data buffering the next multimedia segment following the current one being downloaded and displayed.

In an embodiment the transmission capability between the respective data source and the communication device is determined by requesting the data source to transmit a portion of the multimedia data segment during execution of the first multimedia segment.

This provides a first estimation, given a rough estimation of the available bandwidth between the client and the data source, of the time at which to start the downloading of the next multimedia segment. It also indicates whether some download time saving can be achieved for a given multimedia segment (for priority handling between streams).

In an embodiment the step of determining a time to start downloading said subsequent multimedia data segment comprises defining a time window extending from the current time and having a predetermined time duration such that the execution time slot of at least two multimedia segments of the multimedia data stream falls within the time window.

This time window enables handling of the priorities between the different downloadings of multimedia segments potentially in competition: segments within the time window are classified and depending on this classification, priority can be raised up for one segment and decreased for another set of segments.

In an embodiment when the execution time slot of a multimedia segment falls within the time window the transmission capability for the said multimedia segment is determined.

This enables better estimation and reconsideration of the time to start downloading for the multimedia segments.

In an embodiment, the method includes a step of increasing the transmission rate between the data source of a multimedia segment to be downloaded and the communication device in the case where the current time corresponds to the determined downloading time of the said subsequent multimedia segment to be downloaded.

This provides an adaptation means to avoid missing the deadline of most urgent multimedia segments.

In an embodiment, the transmission rate is increased by reducing the transmission rate of one or more multimedia segments being concurrently transmitted from their respective data sources.

Segments with lower priorities are paused so that the deadlines of a more urgent priority is reached in time.

In an embodiment the processing rate of the respective data source is compared with the processing rate of the communication device to control downloading of the subsequent multimedia segment.

This is to avoid buffer overflow and also to identify multimedia segments for which download time saving can be achieved.

In an embodiment a connection between the communication device and the data source of the subsequent multimedia segment is deactivated if an amount of the multimedia data of the said multimedia segment sufficient for execution of at least part of said multimedia segment has been downloaded.

This avoids buffering too much data in advance in case the multimedia segment would finally not be displayed (user stops browsing).

A further aspect of the invention relates to a communication device, for receiving a multimedia data stream composed of a sequence of multimedia data segments from a plurality of data sources, each multimedia data segment having an execution time slot relative to an execution time slot of an initial multimedia data segment of the sequence the device comprising:

reception means for receiving a first multimedia segment of the sequence of multimedia segments from the respective data source;

execution means for executing said first multimedia segment on the communication device;

determination means for determining, during execution of the first multimedia segment, for at least one multimedia data segment subsequent in the sequence to the first multimedia data segment, a time to start downloading said subsequent multimedia data segment based on the execution time slot of said subsequent multimedia data segment relative to the current time slot and the transmission capability between the data source of the said subsequent multimedia data segment and the communication device; and means for downloading at the determined time the said subsequent multimedia data segment for execution during said execution time slot.

In an embodiment, the data sources correspond to different server devices.

In an embodiment, the reception means is operable to download at least two subsequent multimedia segments simultaneously from at least two different server devices.

In an embodiment, the determination means is configured to determine the transmission capability between the respective data source and the communication device by requesting the data source to transmit a portion of the subsequent multimedia data segment during execution of the first multimedia segment.

In an embodiment, the determination means is configured to determine a time to start downloading said subsequent multimedia data segment by defining a sliding time window extending from the current time and having a predetermined time duration such that the execution time slot of at least two multimedia segments of the multimedia data stream falls within the time window.

In an embodiment, the determination means is operable to determine the transmission capability for the multimedia segment when the said execution time slot of the multimedia segment falls within the time window.

In an embodiment adjustable transmission rate means are provided for increasing the transmission rate between the data source of a multimedia segment to be downloaded and the communication device in the case where the current time corresponds to the determined downloading time of the said subsequent multimedia segment to be downloaded In an embodiment the adjustable transmission rate means is operable to increase the transmission rate by reducing the transmission rate of one or more multimedia segments being concurrently transmitted from their respective data sources.

In an embodiment comparison means are provided for comparing the processing rate of the respective data source with the processing rate of the communication device to control downloading of the subsequent multimedia segment.

In an embodiment means are provided for deactivating a connection between the communication device and the data source of the subsequent multimedia segment if an amount of the multimedia data of the said multimedia segment sufficient for execution of at least part of said multimedia segment has been downloaded.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1A:
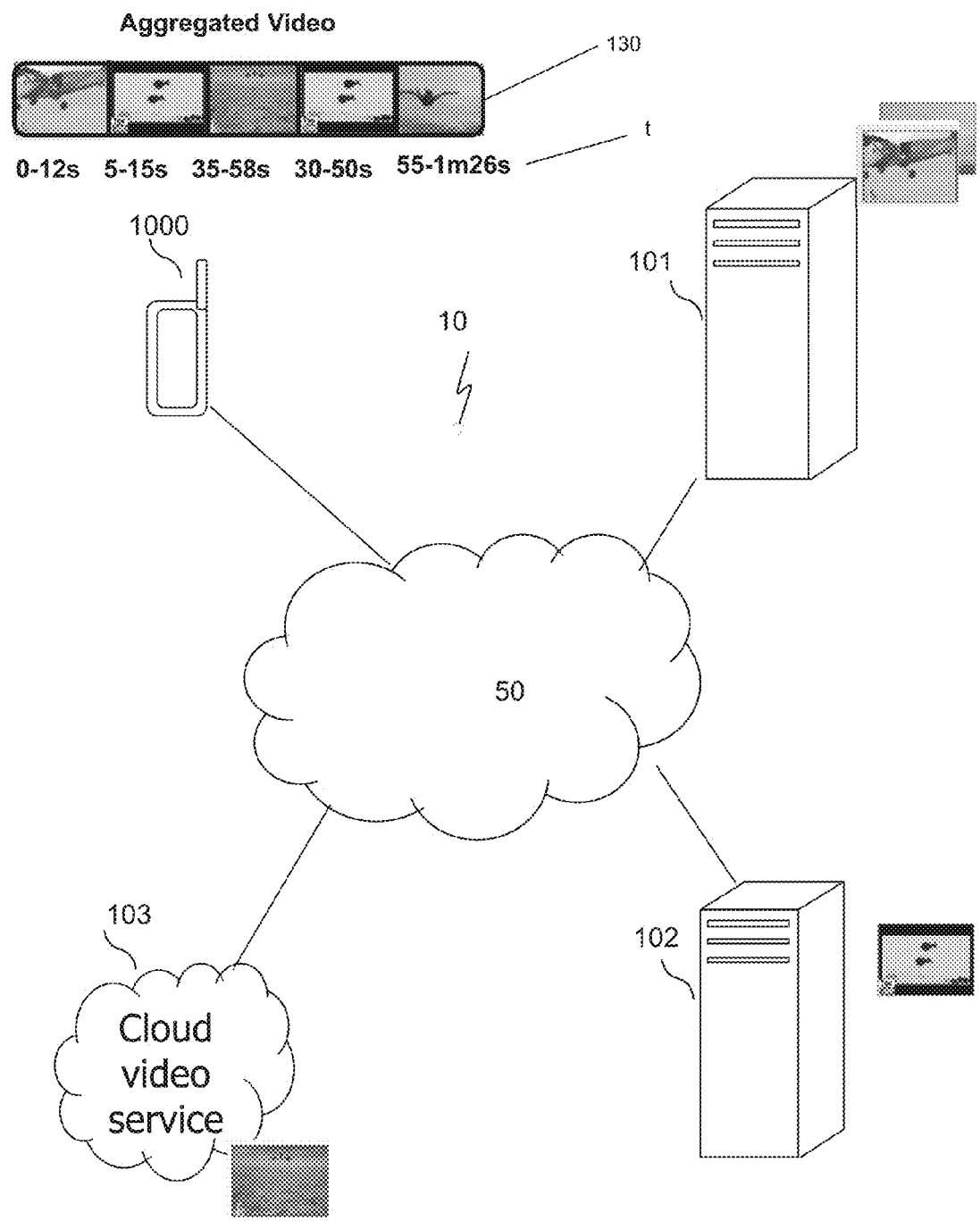
FIG. 1A is a schematic diagram of a wireless communication network in which one or more embodiments of the invention may be implemented.

FIG. 1A illustrates a data communication system 10 in which one or more embodiments of the invention may be implemented. The data communication system 10 comprises a plurality of distributed data sources 101, 102, 103 corresponding to servers 101, 102, and a cloud service 103. Such data sources may be for example popular video sharing web sites or dedicated video services available on the Internet. The data sources 101, 102, 103, are operable to transmit data packets of a data stream to a client terminal device 1000, in this case a wireless multifunction communication device, via a data communication network 50. The data communication network 50 may be a Wide Area Network (WAN) or a Local Area Network (LAN). Such a network may be for example a wireless network (Wi-Fi/802.11a or b or g), an Ethernet network, an Internet network or a mixed network composed of several different networks.

In this example a user has built a video mash up 130 that may be shared with other users. The video mash up 130 is an aggregated video composed of different video segments described as a list of Media Fragments URIs 132 including, in some cases, surrounding mark-up information. The video segments composing the mash up 130 are provided by the distributed data sources 101, 102, 103.

On receiving a video mash up description 132 defining the video mash up 130, another user can start downloading and browsing the video mash up 130 using communication device 150.

Figure 1B:
FIG. 1B is an example of a descriptive file for the aggregated video data of FIG. 1A.

The mash up description 132, as illustrated in FIG. 1B, contains at least a list of Media Fragment URIs (for example: temporal Media Fragments) referencing the media data segments composing the video mash up 130 thereby providing location and timing information for video data extraction, streaming and display.

Figure 1C:
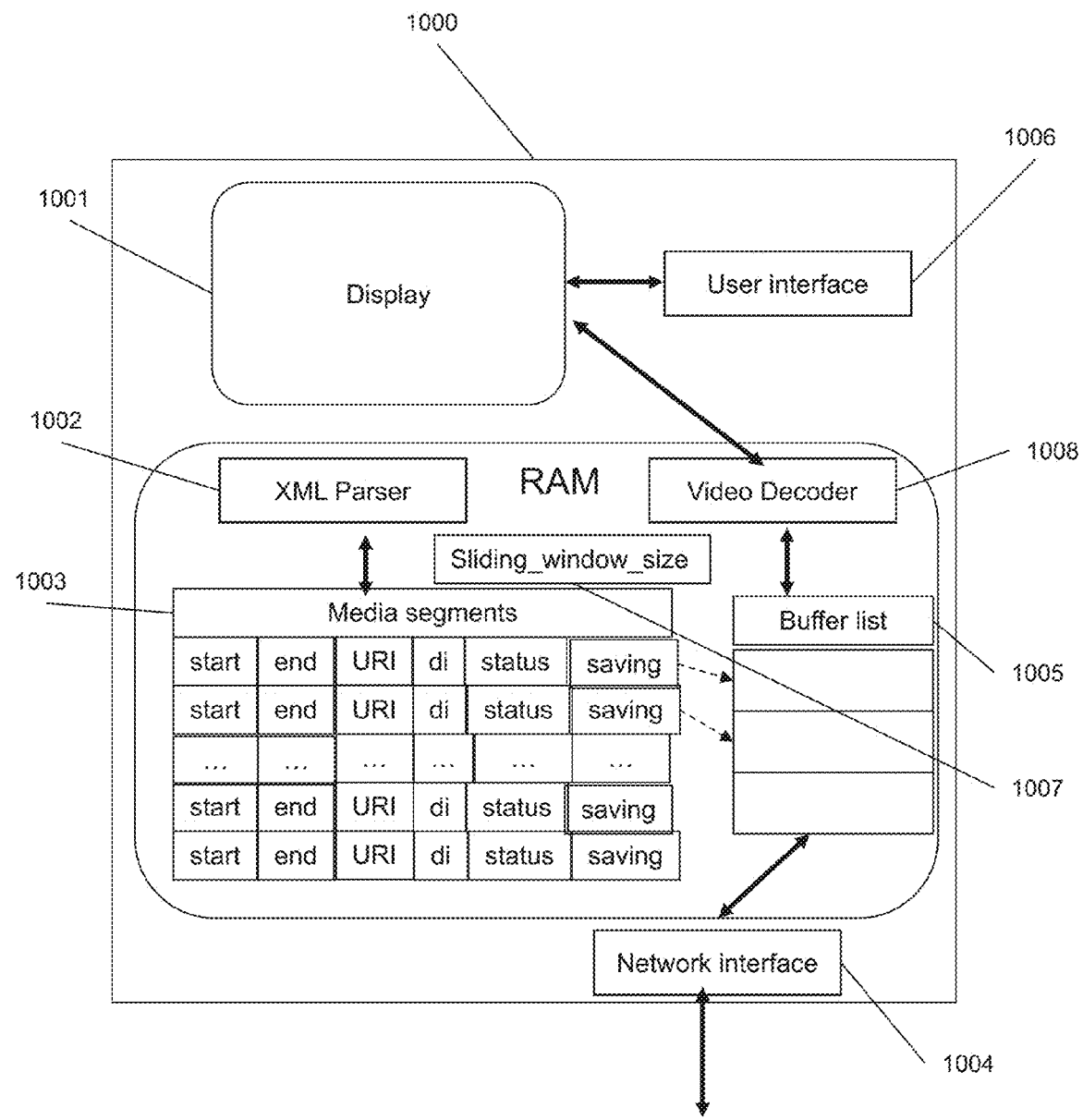
FIG. 1C is a schematic block diagram of a communication device according to at least one embodiment of the invention.

FIG. 1C illustrates a client terminal device 1000 configured to implement at least one embodiment of the present invention. The client terminal device may be a device such as a micro-computer, a workstation or a light portable device such as a smart phone, a multi-function portable communication deice or a portable computer. The client terminal device 1000 comprises:
- a central processing unit, such as a microprocessor (not shown);
- a display 1001 for displaying data and/or serving as a graphical user interface; in some embodiments the display may be a touch sensitive screen;
- a user interface 1006 such as a keyboard, a mouse, a pointer, a joystick, a tract ball etc.
- an XML parser 1002 for parsing XML data;
- a read only memory (not shown), for storing computer programs for implementing embodiments of the invention;
- a random access memory, denoted RAM, which may be used for storing the executable code of the method of embodiments of the invention as well as the media segment data 1003 and buffered data 1005 according to embodiments of the invention;
- a network interface 1004 for connection to a communication network over which data to be processed is transmitted or received; and
- a video decoder 1008 for decoding video data.

Figure 2:
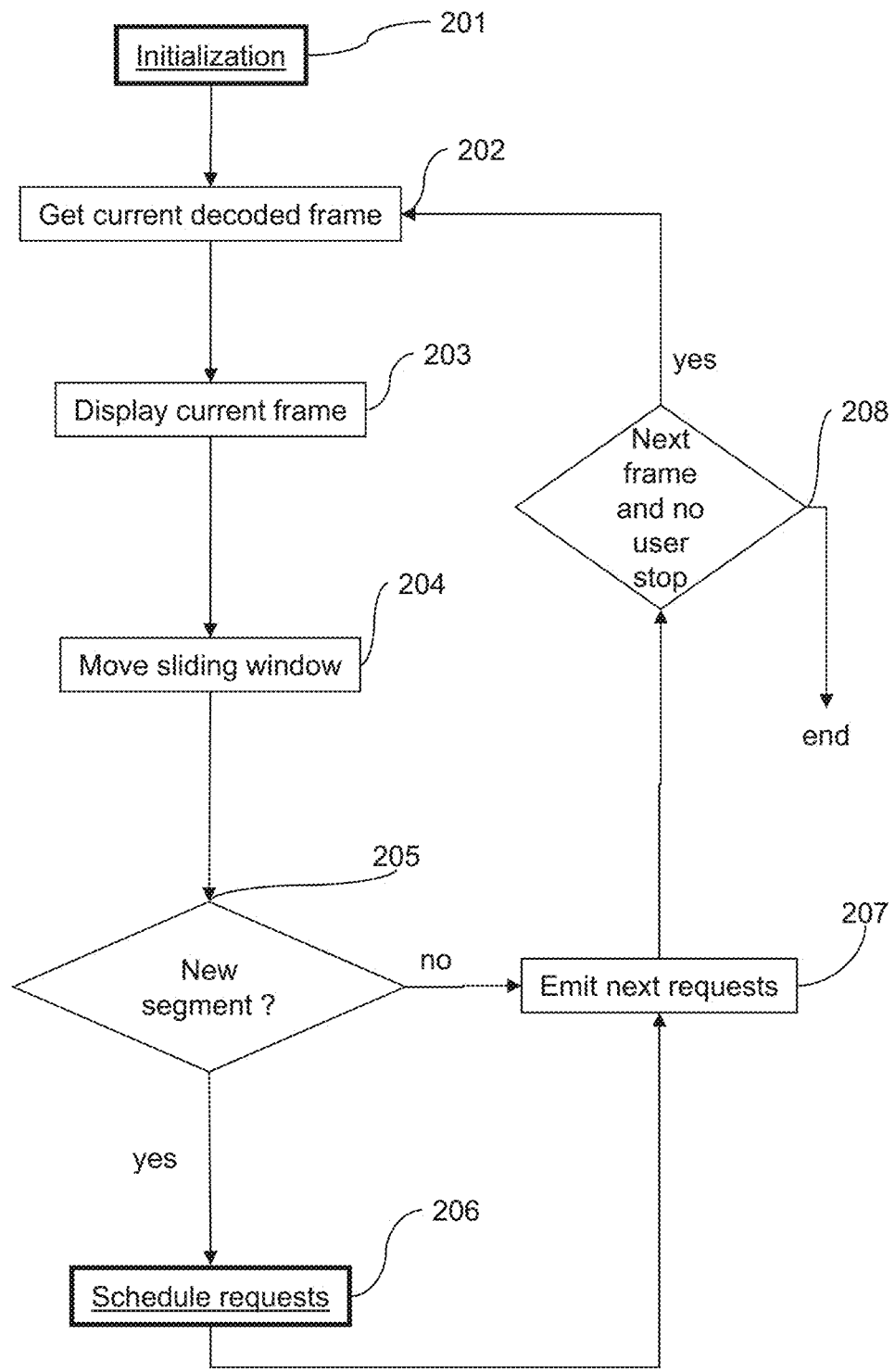
FIG. 2 is a flow chart illustrating steps of a method of receiving and displaying video data according to at least one embodiment of the invention.

FIG. 2 illustrates a method of receiving video data of a video mash-up (aggregated video data) according to a first embodiment of the invention, for display of the video mash-up.

Figure 4:
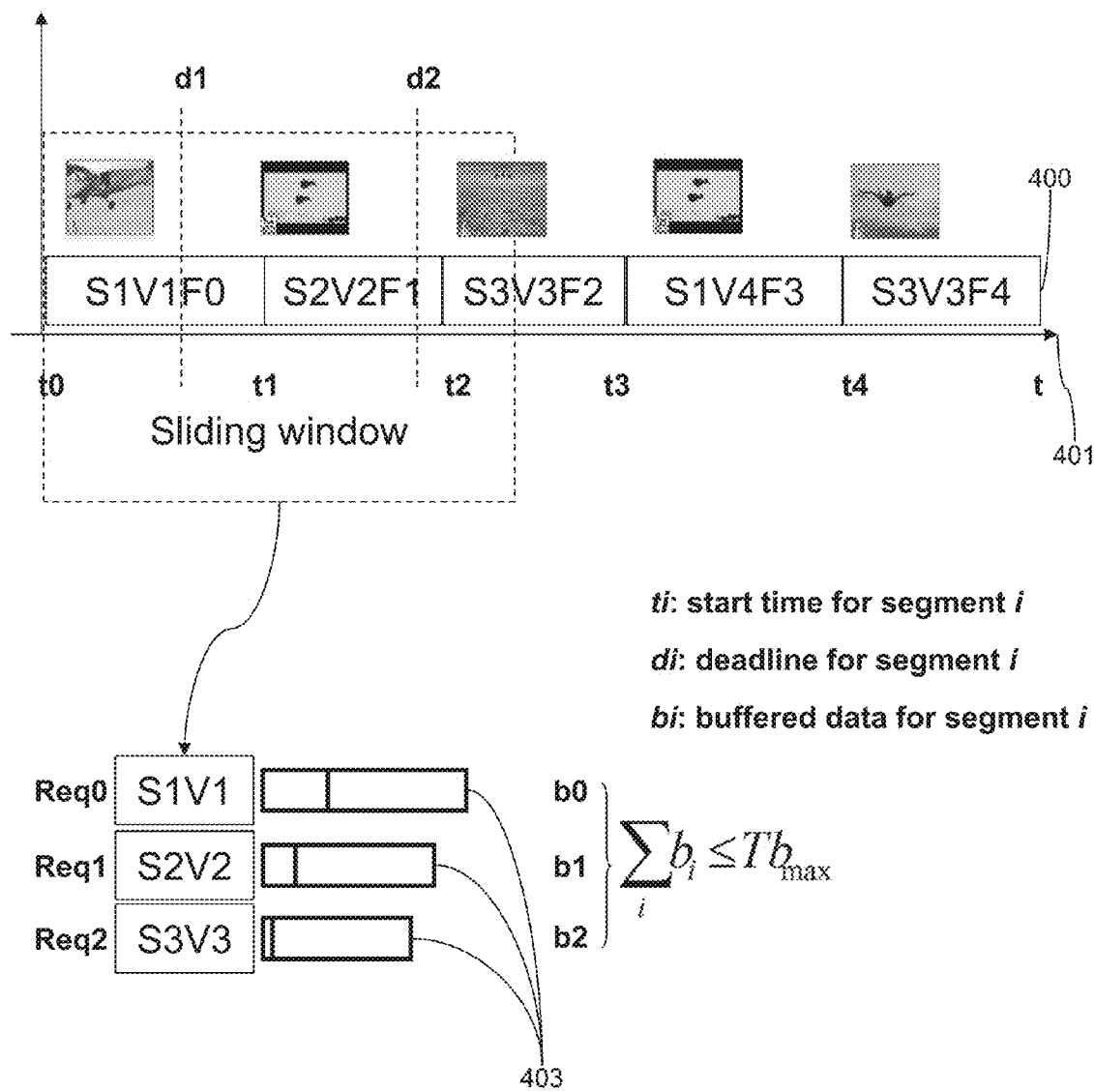
FIG. 4 schematically illustrates a method of scheduling downloading times of multimedia segments of a multimedia data sequence according to at least one embodiment of the invention.
Figure 5:
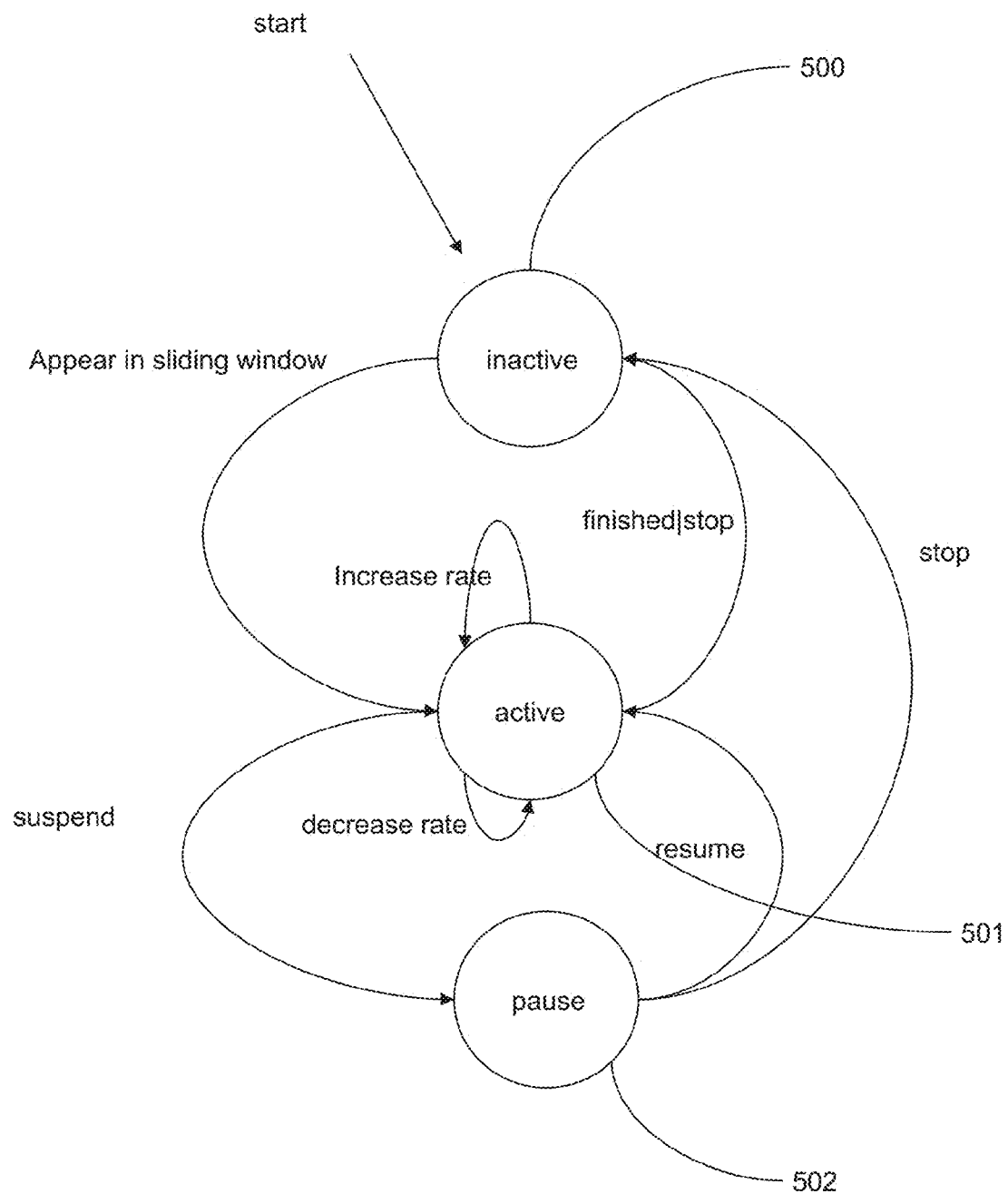
FIG. 5 schematically illustrates a method of control of communication connections between data sources and the client terminal device according to an embodiment of the invention.

The process starts with an initialization step 201 that will be described in more detail with reference to FIGS. 3 to 5. In the initialisation step 201 the media mash-up description 132 is parsed and initialization of an internal video player of the client terminal device 1000 is performed with the current time being set to 0. Following the initialization step 201, the client terminal 1000 begins receiving and decoding video data frames of the media fragments in step 202. The current video data frame being executed is then displayed on the display screen 1001 of the client terminal device 1000 in step 203. Next, the current playing time is incremented by a factor: 1/frame_rate of the video to obtain an updated current time. For the updated current time, the video player moves a sliding time window SW, as illustrated in FIG. 4, along a time scale t in step 204. The sliding time window is a time slot extending from the current time for a predetermined time duration. If a new media segment of the media data to be displayed as defined in the mash up description 132 appears in the sliding time window (test of step 205 true), request scheduling is performed in step 206 to download the media segment. Following request scheduling step 206, or directly after test step 205 in the case where no new media segment appears in the time window, the client issues requests for any subsequent media segments contained in the sliding time window in step 207. Then, in step 208, the next video frame (if there is a subsequent video frame) becomes the current video frame to be executed and the video player iterates on steps 202 to 208 until it reaches the end of the video mash up 130 or until the user stops browsing the video mash up 130.

The step of initialisation 201 of FIG. 2 will now be described in more detail with reference to FIGS. 3 and 4.

A first step of the initialisation process includes receiving the video mash up description 132 at the client terminal device 1000. The video mash up description 132 may be obtained, for example, by following a hyperlink to the XML description file (displayed on a Web page, sent by mail . . . ) provided by a user who defined and shared the video mash up. As illustrated in FIG. 1 B, the mash up description 132 may include a simple list of Media Fragments URIs referencing the different media segments composing the video mash up. The client terminal 1000 then reads the description from the XML file using an XML parser 1002 and builds up a representation of the video mash up as illustrated in FIG. 4; i.e. loads into memory the list of Media Fragments URIs to resolve in order to obtain the media segments composing the video mash up by means of network interface 1004. The client terminal 1000 prepares an empty media segment list 1003 to store media segments and sets a current_time parameter to an initial value of 0. Then, for each Media Fragment URI in the description parsed by the XML parser 1002, a new media segment in media segment list 1003 is allocated and each of the media segment parameters are initialised as follows: a media segment status is set to inactive, the URI corresponds to the Media Fragments URI provided in the mash up description 132, a start time is set to the current value of current_time parameter, which is incremented by the time duration of the current media segment (the time duration may be retrieved either from timing attributes in the XML syntax or by parsing the Media Fragments URI that contains time parameters) and the end time is set to this new value of current_time plus the time duration.

By concatenation of the Media Fragment URIs (400 in FIG. 4), the client terminal device 1000 can build a display timeline 401 having a list of switch times ($t_i$) between execution of one media segment and the following media segment in the video mash up. Next, based on the so-built display timeline 401, the client terminal 1000 initializes a sliding time window size 1007 for sliding window SW covering several seconds of the video mash up (for example at least equal to the duration of the 2 smallest media segment time durations). The size of the sliding window is stored in the RAM of the client terminal device as a sliding_window_size parameter 1007. The client terminal 1000 allocates a pool of buffers bi (403, FIG. 4 and 1004 FIG. 10) for storing received data for active media segments. Finally the Web Client sets the value of current_time parameter to 0 indicating that it is ready to start displaying the video data. The Web Client is now ready for the request scheduling as described with reference to FIG. 3.

Figure 3:
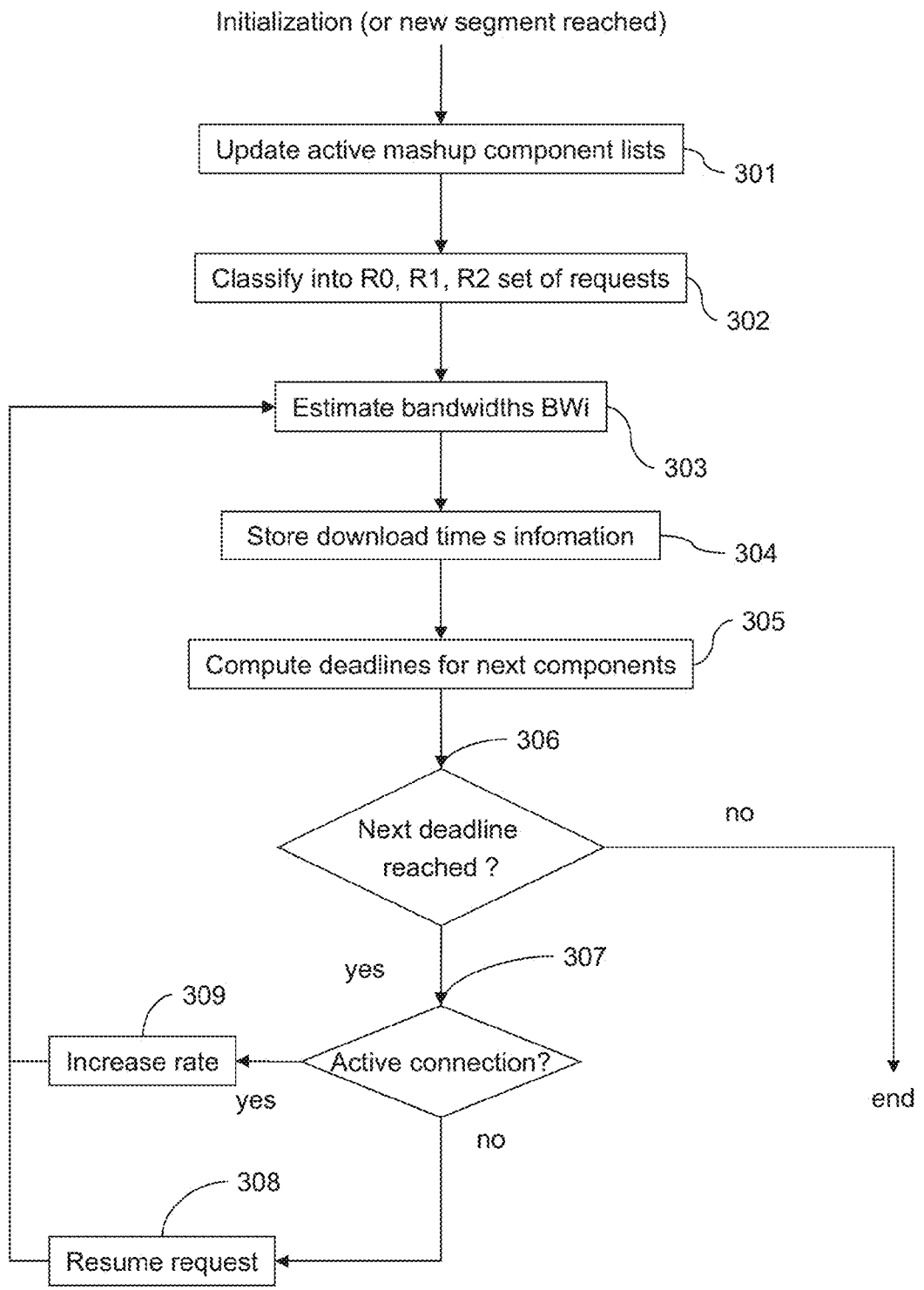
FIG. 3 is a flow chart illustrating steps of a method of scheduling downloading times of multimedia segments of a multimedia data sequence according to at least one embodiment of the invention.

FIG. 3 illustrates steps of request scheduling according to the first embodiment of the invention. The request scheduling may occur at start up; when a user seeks a video mash up, or each time the sliding window encounters a new media segment in step 205 of FIG. 2.

In step 301, the client terminal device 1000 starts to update its current list of active media segments 1003. This process is performed in 2 steps: firstly the client terminal device 1000 computes which video segments of the video mash-up have start and end times (i.e. execution time slots) which fall within the time interval of the sliding time window, i.e. within the time slot defined as [current_time, current_time+sliding_window_size]. Each of the video segments identified as occurring within the sliding time window has its media segment status parameter set to active. These video segments are then classified into 3 sets of requests: R0, R1, and R2 in step 302. R0 corresponds to a request for the current media segment being displayed, R1 corresponds to a request for the next media segment to display; and R3 corresponds to a request for subsequent media segments. R0 and R1 may each correspond to a request to download one media segment while R2 can be empty, contain a request for one media segment or several requests to download several media segments. Next step 303 involves an estimation of the bandwidth between the client terminal 100 and the different data source servers providing the respective media segments. Since media segments can be located on different servers and originate from different media presentations, the client terminal tests the responsiveness of these different servers as well as the complexity of the media stream in terms of decoding and display for each media segment.

To determine server responsiveness, one buffer in the buffer pool 1005 of client terminal 100 is assigned to each active media segment from the descriptive list of media fragments 1003.

Next a request to receive the initial seconds, for example the initial 2 seconds of each active media segment is submitted to the different servers storing the media fragments of the video mash-up and the corresponding HTTP connections are left open. This is done using the Media Fragment URI stored in the media segments description list 1003 with "end_time" parameter (http://theServer/thevideo#t=start_time, end_time) of the temporal Media Fragments being modified (it may be noted that when the client already has a description of the different media resources, it can compute time ranges to byte ranges equivalences and then submit byte-ranges HTTP requests). This enables the client to have a rough estimation of the different bandwidths BWi corresponding to the different servers storing the media segments of the video mash up. In step 304 the download times from the various servers are stored.

The estimated bandwidths between the client terminal device and the data sources 101, 102, 103 provide information for the computation of the download deadlines for each active media segment in step 305. If a bandwidth to a server is estimated as being slow, the associated media segment download should be started further in advance with respect to its execution time slot, while if the bandwidth is high, the start of download can be closer to the execution time slot of the media segment.

The download deadlines for each media segment to be downloaded are computed in step 305 according to the formula:

$$d_i = t_i + \min\left(\nabla t, \left(D_i - \frac{S_{ri} \times D_i}{BW_i}\right)\right)$$

where:
$t_i$ is the current time; i.e. the time of the last displayed frame
$D_i$ is the duration of the media segment to be downloaded (obtained from its description),
$S_{ri}$ is the estimation of the source rate in bytes per second of the media segment (obtained or provided in the server's response to the Media Fragments request, in the Content-Range-Mapping HTTP header that provides the byte-ranges corresponding to the given duration)
$BW_i$ is the estimated bandwidth available between the client terminal and the server storing the media segment to be downloaded (step 303)
$\nabla_t$ is the default margin (ex: 2 seconds) between download and execution time of a media segment.

Requesting the initial seconds of each media segment also allows the client to compute statistics on the rate of the media source (average number of bits per second). This information is useful for comparing with the processing capabilities of the video decoder 1008 running on the client. Indeed, this provides an indication of the potential risk of buffer overflow and also indicates whether some download time saving is possible for a given media segment. The download time information is stored in media segments list 1003 in step 304.

The computed download deadline for the respective media segment is stored as a di parameter in the media segment representation in the list of media segments 1003. The next step 306 comprises checking whether the current_time corresponds to a deadline for one of the active media segments to be downloaded. If this is not the case, the display process of FIG. 2 is returned to after step 306. If a download deadline is reached for a subsequent media segment, step 307 comprises checking whether or not the associated connection is active (status parameter=ACTIVE in media segment list 1003). The different states of a connection (one connection is associated with one media segment) are represented in FIG. 5. At start time (step 201 of FIG. 2), all connections are inactive (and may even not be created) represented by inactive state 500. A connection becomes active, state 501, when the associated media segment intersects the sliding window (test 205 of FIG. 2). An active connection can then be deactivated (returned to inactive state 500) if the user stops browsing. An active connection can also be paused, state 502, by the client terminal if some download time saving is possible for that connection and if enough data has been buffered. More granular control can be obtained by different means to increase or decrease the rate of one connection (loops on state 501). For example, the client can modify the TCP acknowledgements messages to artificially decrease the rate of one connection and to put more emphasis onto other active connections.

If the connection is not active, then the client resumes the connection in step 308 by submitting a new time range or byte range request for the corresponding media segment (step 207 of FIG. 2). This is followed by a loop on steps 303 to 306 in order to provide a better estimation of the bandwidth sharing between the active connections, while no download deadline has been reached at step 306. This loop can be performed in parallel with the display process described with reference to FIG. 2.

If the connection is already active (step 307 true), the client increases the rate for this connection in step 309. To perform the increase in connection rate the client terminal looks in the list of active connections for connections with download time savings set to true. It can pause or artificially decrease the rate of the corresponding connections starting with those pertaining to R2 requests. Then, for each active connection, the next requests are issued by the client in step 207. This involves requesting the next few seconds e.g. 2 seconds (or corresponding byte-range) for each active media segment.

By doing so, the client terminal 1000 has the opportunity to periodically adapt the downloading rate allocated between the different media segments and thus to dynamically adjust the download deadlines to download the next media segments. For the periodic check, the download deadline estimation can also take into account the amount of data already buffered for a media segment in order to obtain more a precise download deadline: the term $S_{ri} \times D_i$ would become $S_{ri} \times D_i - b_i$, bi being the number of bytes already buffered for a media segment i.

The different media segments of the video mash up may thus be downloaded at the computed downloading times for smooth execution during their respective execution time slot of the video mash up.

Embodiments of the invention thereby provide a method of downloading media segments of a media stream from different sources which enables a smooth transition between the executions of the different media segments.

Although the present invention has been described hereinabove with reference to specific embodiments, the present invention is not limited to the specific embodiments, and modifications will be apparent to a skilled person in the art which lie within the scope of the present invention.

For instance, while in the foregoing examples the media segments correspond to video data it will be appreciated that the media segments may correspond to video and audio data, or audio data or other types of media data for execution of a client terminal. It will be further appreciated that the client terminal may be connected to the various data sources by wireless connections, wired connections or a mixture of wireless and wired connections.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of receiving, at a communication device, a multimedia data stream composed of a sequence of multimedia data segments from a plurality of data sources, each multimedia data segment having an execution time slot relative to an execution time slot of an initial multimedia data segment of the sequence the method comprising the steps of:

receiving a first multimedia segment of the sequence of multimedia segments from the respective data source, and executing the first multimedia segment on the communication device;

wherein during execution of the first multimedia segment, for at least one subsequent multimedia data segment of the sequence, the method further comprises the steps of:

requesting the data source of the subsequent multimedia data segment to transmit a portion of the subsequent multimedia data segment;

determining the transmission capability between the communication device and the data source, based on the transmitted portion of the subsequent multimedia data segment, determining a time to start downloading the subsequent multimedia data segment, based on the execution time slot of the subsequent multimedia data segment relative to the current time slot and the transmission capability between the data source of the subsequent multimedia data segment and the communication device; and downloading, at the determined time, the subsequent multimedia data segment for execution during the execution time slot.

2. A method according to claim 1, wherein the data sources correspond to different server devices.

3. A method according to claim 2, wherein at least two subsequent multimedia segments are simultaneously downloaded from at least two different server devices.

4. A method according to claim 1, wherein the step of determining a time to start downloading the subsequent multimedia data segment comprises defining a sliding time window extending from the current time and having a predetermined time duration such that the execution time slot of at least two multimedia segments of the multimedia data stream falls within the time window.

5. A method according to claim 4, wherein when the execution time slot of a multimedia segment falls within the time window the transmission capability for the multimedia segment is determined.

6. A method according to claim 1, comprising a step of increasing the transmission rate between the data source of a multimedia segment to be downloaded and the communication device in the case where the current time corresponds to the determined downloading time of the subsequent multimedia segment to be downloaded.

7. A method according to claim 6, wherein the transmission rate is increased by reducing the transmission rate of one or more multimedia segments being concurrently transmitted from their respective data sources.

8. A method according to claim 1, wherein the processing rate of the respective data source is compared with the processing rate of the communication device to control downloading of the subsequent multimedia segment.

9. A method according to claim 8, wherein a connection between the communication device and the data source of the subsequent multimedia segment is deactivated if an amount of the multimedia data of the multimedia segment sufficient for execution of at least part of the multimedia segment has been downloaded.

10. A communication device for receiving a multimedia data stream composed of a sequence of multimedia data segments from a plurality of data sources, each multimedia data segment having an execution time slot relative to an execution time slot of an initial multimedia data segment of the sequence, the device comprising:

a network interface configured to:
- receive a first multimedia segment of the sequence of multimedia segments from the respective data source,
- request, for at least one multimedia data segment subsequent in the sequence to the first multimedia data segment, the data source of the subsequent multimedia data segment to transmit a portion of the subsequent multimedia data segment, and
- download, at a determined time, the subsequent multimedia data segment for execution during the execution time slot; and a central processing unit configured to:
- execute the first multimedia segment on the communication device,
- determine the transmission capability between the communication device and the data source, based on the transmitted portion of the subsequent multimedia data segment, and
- determine, during execution of the first multimedia segment, a time to start downloading the subsequent multimedia data segment, based on the execution time slot of the subsequent multimedia data segment relative to the current time slot and the transmission capability between the data source of the subsequent multimedia data segment and the communication device.

11. A device according to claim 10, wherein the data sources correspond to different server devices.

12. A device according to claim 11, wherein a network interface is operable to download at least two subsequent multimedia segments simultaneously from at least two different server devices.

13. A device according to claim 10, wherein the central processing unit is configured to determine a time to start downloading the subsequent multimedia data segment by defining a sliding time window extending from the current time and having a predetermined time duration such that the execution time slot of at least two multimedia segments of the multimedia data stream falls within the time window.

14. A device according to claim 13 wherein the central processing unit is operable to determine the transmission capability for the multimedia segment when the execution time slot of the multimedia segment falls within the time window.

15. A device according to claim 10, wherein the central processing unit is further configured to increase the transmission rate between the data source of a multimedia segment to be downloaded and the communication device in the case where the current time corresponds to the determined downloading time of the subsequent multimedia segment to be downloaded.

16. A device according to claim 15, wherein the central processing unit is further configured to increase the transmission rate by reducing the transmission rate of one or more multimedia segments being concurrently transmitted from their respective data sources.

17. A device according to claim 10, wherein the central processing unit is further configured to compare the processing rate of the respective data source with the processing rate of the communication device to control downloading of the subsequent multimedia segment.

18. A device according to claim 17, wherein the central processing unit is further configured to deactivate a connection between the communication device and the data source of the subsequent multimedia segment if an amount of the multimedia data of the multimedia segment sufficient for execution of at least part of the multimedia segment has been downloaded.

19. A non-transitory computer-readable storage medium storing instructions of a computer program for implementing a method, according to claim 1.

* * * * *